US012644524B2

(12) United States Patent
Lecchi et al.

(10) Patent No.: US 12,644,524 B2
(45) Date of Patent: Jun. 2, 2026

(54) FIXED SEAT SHUT-OFF VALVE AND PROCESS FOR ASSEMBLING THE SAME

(71) Applicant: Buti Research S.r.L., Cenate Sotto (IT)

(72) Inventors: Stefano Lecchi, Bolgare (IT);
Pierangelo Scaglia, Voghera (IT)

(73) Assignee: Buti Research S.r.L., Cenate Sotto (IT)

( * ) Notice: Subject to any disclaimer, the term of this
patent is extended or adjusted under 35
U.S.C. 154(b) by 0 days.

(21) Appl. No.: 18/711,136

(22) PCT Filed: Nov. 29, 2022

(86) PCT No.: PCT/EP2022/083678
§ 371 (c)(1),
(2) Date: May 17, 2024

(87) PCT Pub. No.: WO2023/099479
PCT Pub. Date: Jun. 8, 2023

(65) Prior Publication Data
US 2025/0012363 A1      Jan. 9, 2025

(30) Foreign Application Priority Data

Nov. 30, 2021    (IT) ........................ 102021000030335

(51) Int. Cl.
*F16K 5/06*          (2006.01)
(52) U.S. Cl.
CPC .......... *F16K 5/0689* (2013.01); *F16K 5/0605*
(2013.01)
(58) Field of Classification Search
CPC .... F16K 5/0668; F16K 5/0678; F16K 5/0689;
F16K 5/0636; F16K 27/067; F16K 1/226;
F16K 1/2263; F16K 1/427
See application file for complete search history.

(56) References Cited

U.S. PATENT DOCUMENTS 3,398,925 A * 8/1968 Scaramucci .......... F16K 5/0689
251/315.11
5,169,124 A   12/1992 Spears et al.
(Continued)

FOREIGN PATENT DOCUMENTS

CN        204610943 U      9/2015
CN        113503375 A     10/2021
(Continued)

OTHER PUBLICATIONS

Machine English translation of CN-116357763-A (Year: 2025).*

*Primary Examiner* — Hailey K. Do
(74) *Attorney, Agent, or Firm* — Patterson Intellectual
Property Law, PC

(57)          ABSTRACT

A fixed seat shut-off valve comprises: includes a valve body
adapted to receive a closure member, with at least one valve
inlet, at least one valve outlet, and a top-entry opening; a
closure member received in the valve body and movable
relative to the valve body between a valve closed position
and a valve open position; at least one removable sealing
seat for the closure member comprising a sealing region
designed to sealingly cooperate with the closure member,
the at least one sealing seat being fixedly received at least
partially in a respective receiving seat formed in the valve
body in the area of at least one of the at least one valve inlet
and at least one valve outlet; a sealing element is interposed
between the sealing seat and the receiving seat formed in the
valve body. The valve further includes removable fastening
means for fastening the sealing seat in the respective receiv-
ing seat (24), and axially interposed between the sealing seat
and shoulders formed in the valve body.

20 Claims, 14 Drawing Sheets

(56)                   References Cited

U.S. PATENT DOCUMENTS 6,206,023  B1     3/2001  Landers
2011/0266484  A1     11/2011  Dalluge et al.

FOREIGN PATENT DOCUMENTS

CN            116357763  A   *   6/2023   ........... F16K 5/0626
WO              0138761  A1      5/2001

* cited by examiner

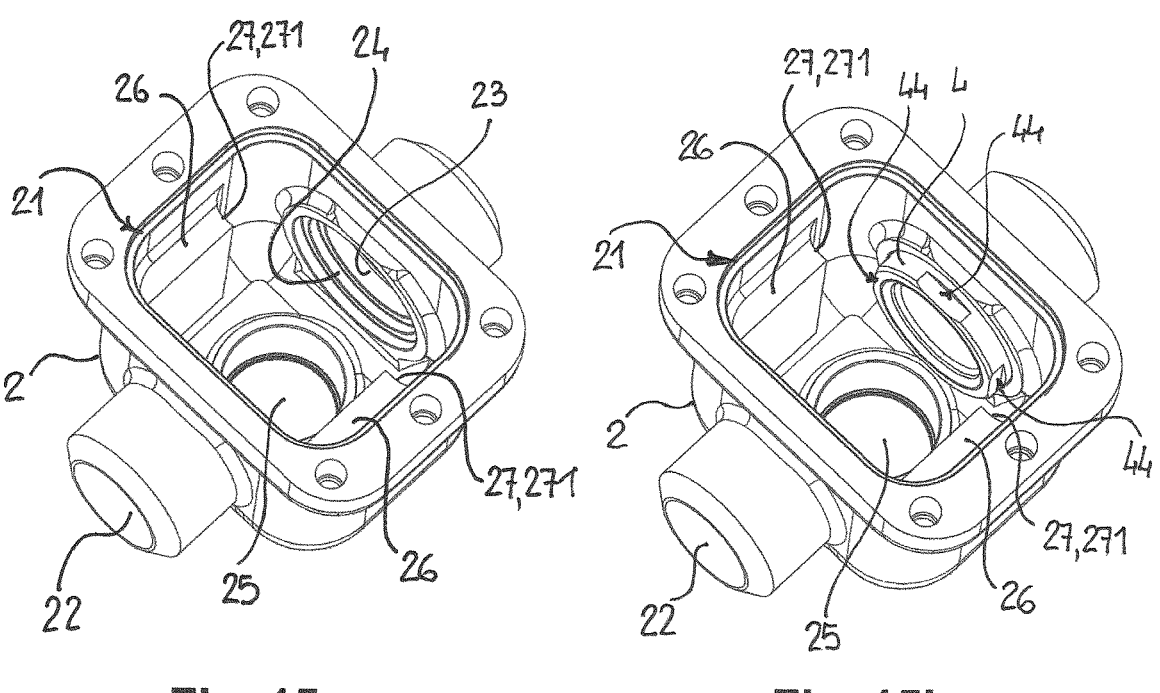
Fig. 15a
Fig. 15b
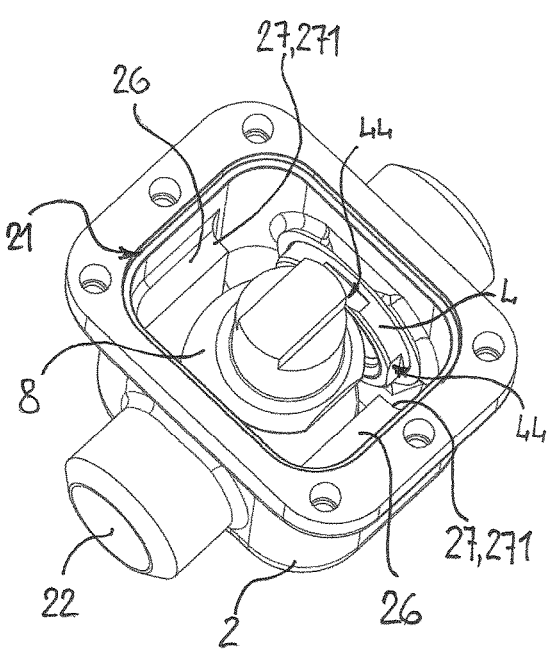
Fig. 15c
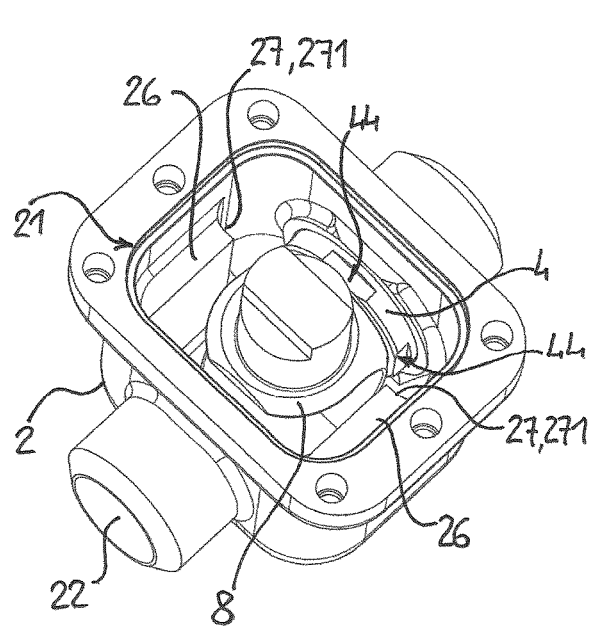
Fig. 15d

FIXED SEAT SHUT-OFF VALVE AND PROCESS FOR ASSEMBLING THE SAME

The present invention concerns a fixed seat shut-off valve and relative assembly process.

As known, shut-off valves serve to allow or prevent a fluid flow in a line in which they are installed and are typically designed for on/off, namely open/closed, operation. These valves must guarantee a low resistance to the flow in the open configuration and a high seal in the closed configuration.

A shut-off valve essentially comprises a valve body having at least one valve inlet and at least one valve outlet, a closure member received in the valve body and movable relative to the valve body between a valve closed position and a valve open position, and at least one sealing seat for the closure member, arranged in the valve body in the area of at least one of the valve inlet and the valve outlet. In the closed position, the closure member sealingly cooperates with the at least one sealing seat to guarantee the valve seal.

In shut-off valves for industrial use, the sealing seat is typically made as a separate element, removably assembled in a respective receiving seat formed in the valve body. This allows removal of the sealing seat to facilitate inspection or maintenance operations thereon, or to replace it when worn or damaged.

In this case, the sealing seat can be assembled in its receiving seat in an axially fixed manner (fixed seat configuration), or in an axially movable manner (floating seat configuration). In the case of fixed assembly, the seal between the sealing seat and the closure member is of static type and is guaranteed by means of an appropriate reciprocal arrangement of these components inside the valve body, such that in the closed position the closure member cooperates with the sealing seat with a certain degree of interference. In the case of a floating assembly, the seal between the sealing seat and the closure member is of dynamic type and is guaranteed by elastic means interposed between the sealing seat and the respective receiving seat and appropriately sized to axially maintain the sealing seat pressed against the closure member in the closed position.

For applications in particularly demanding operating conditions, in which a high level of reliability is required such as, for example, cryogenic and petrochemical applications, or in the presence of solid particles (dirty service), static seal valves with fixed seat configuration tend to be preferred. Furthermore, these valves have the advantage of providing a bidirectional seal also with the use of a single sealing seat.

In the known shut-off valves with fixed seat configuration, the sealing seat is typically fixed in the respective receiving seat in the valve body by means of threaded connections.

In the case of ball valves, for example, solutions are known in which the sealing seat has externally a threaded portion designed to cooperate with a corresponding threaded portion formed in the relative receiving seat in the valve body. Alternatively, in particular for valves with a larger diameter, the sealing seat can be without a threaded portion and the assembly can be carried out by the interposition of a threaded bush which is screwed into the receiving seat and to which the sealing seat is then axially fixed by means of a plurality of axial screws.

These solutions, although suitable for providing a fixed seat configuration, make disassembly and reassembly of the sealing seat from/in the valve body, for inspection, maintenance or replacement thereof during the working life of the valve, somewhat lengthy and laborious, particularly in the case of valves installed in line. In extreme cases, furthermore, deterioration of the threaded connections with consequent seizure, for example following long periods of operation and/or particularly demanding operating conditions, can make removal of the sealing seat practically impossible. In cases where the fixing requires the use of screws and the like, there is the further inconvenience of having to handle a plurality of small parts.

In the light of the above, the main object of the present invention is to provide a fixed seat shut-off valve and a process for assembling the same that allow removal and reassembly of a sealing seat from/in the respective valve body simply and rapidly, even when these operations have to be carried out on valves installed in line.

A further object of the invention is to provide a fixed seat shut-off valve with the above-mentioned characteristics which can also be manufactured simply and at competitive costs.

According to the invention, said objects are achieved by means of a fixed seat shut-off valve having the characteristics described in claim 1 and by means of a relative assembly process comprising the steps described in claim 13.

In particular, in a first aspect, the invention concerns a fixed seat shut-off valve comprising: a valve body adapted to receive a closure member and provided with at least one valve inlet and at least one valve outlet extending along respective longitudinal axes, and with a top-entry opening, a closure member received in the valve body and movable relative to the valve body between a valve closed position and a valve open position, and at least one removable sealing seat for the closure member, comprising a sealing region designed to sealingly cooperate with the closure member. The sealing seat is at least partially fixedly received in a respective receiving seat formed in the valve body at at least one of said at least one valve inlet and at least one valve outlet. A further sealing element is placed between the sealing seat and said receiving seat formed in the body valve.

According to the invention, the sealings seat is fastened in the receiving seat by means of removable fastening means axially interposed between the sealing seat and shoulders formed in the valve body and abut at least axially against first abutment regions defined on the sealing seat and second abutment regions defined on said shoulders.

In the context of the present description and the subsequent claims, the terms "axially" and "axial direction" want to mean a direction substantially parallel to the longitudinal axis of the at least one valve inlet and/or of the at least one valve outlet.

Furthermore, the terms "transversally" and "transverse direction" want to mean a direction substantially parallel to the longitudinal axis of the at least one valve inlet and/or of the at least one valve outlet.

The invention advantageously proposes fastening at least axially the sealing seat with respect to its receiving seat in the valve body by means of fastening means axially interposed between and cooperating in abutment against the sealing seat and suitable shoulders formed in the valve body, in an opposite position in front of the sealing seat. The application and removal of said fastening means therefore require only an insertion or extraction thereof into/from interspaces defined in the valve body between the sealing seat and the shoulders, and are therefore particularly simple and rapid. In particular, more inconvenient and laborious screwing and unscrewing operations, necessary in the case of threaded connections, are avoided. Consequently, also assembly and disassembly of the sealing seat are simplified and speeded up, also in the case of valves installed in line.

The absence of threaded connections also avoids the above-mentioned drawbacks connected with deterioration thereof during the working life of the valve. Furthermore, the manufacture of the valve body and sealing seat is simplified in this case, since machining operations for the creation of threaded portions and/or holes for threaded elements in said components can be avoided, and this has a positive effect on the overall manufacturing costs of the valve of the invention.

The shut-off valve of the invention furthermore has a configuration with top-entry opening, which guarantees maintainability of the valve also in line and at the same time allows a significant reduction in the overall weight thereof.

Preferably, the fastening means are axially interposed between the sealing seat and the shoulders with interference. The degree of interference should in any case always allow manual extraction of the fastening means, directly or with the aid of a suitable extractor tool.

Preferably, the fastening means abut against the first abutment regions defined on the sealing seat also transversally. In this way, the fastening means can advantageously secure the sealing seat not only relative to axial movements but also relative to any rotations.

According to a preferred embodiment, the fastening means are made in a single piece. The application and removal of the fastening means, and therefore the operations for assembly and disassembly of the sealing seat, are in this case particularly simple and rapid, since the number of components involved is minimized.

In this case the fastening means can preferably comprise a flat plate-like element having two opposite faces and a recess, which extends from a peripheral edge of the plate-like element and is arranged and configured so as to expose at least a sealing region of the sealing seat when the plate-like element is axially interposed between the sealing seat and the shoulders in the valve body. The plate-like element abuts axially against the first abutment regions defined on the sealing seat and the second abutment regions defined at the shoulders in the valve body respectively by means of one of the two opposite faces thereof.

Alternatively, the fastening means can preferably comprise a shaped plate-like element having a flat central portion provided with a recess, which extends from a peripheral edge of the flat central portion and is arranged and configured so as to expose at least the sealing region of the sealing seat when the plate-like element is axially interposed between the sealing seat and the shoulders in the valve body, and two flanges that extend perpendicularly from the same face of the central portion, on opposite sides relative to said recess. The plate-like element axially abuts against the first abutment regions defined on the sealing seat and the second abutment regions defined at the shoulders in the valve body respectively by means of a face of the central portion opposite the face from which the two flanges extend and by means of peripheral edges of the two flanges.

To prevent axial translations and also rotations of the sealing seat, in the above-mentioned embodiments the flat plate-like element or the shaped plate-like element can expediently be arranged transversally across the sealing seat by means of the respective recess and abuts also transversally against the first abutment regions defined on the sealing seat by means of peripheral edges of the recess.

In alternative preferred embodiments, the fastening means can consist of several distinct elements, more preferably two distinct elements.

In this case, the fastening means can preferably comprise a pair of profile bars arranged on transversally opposite sides relative to the sealing seat.

Preferably, the profile bars have a generically L-shaped profile and axially abut against the first abutment regions defined on the sealing seat and against the second abutment regions defined at the shoulders in the valve body respectively by means of a face of a first flange of the L-shape and a peripheral edge of a second flange of the L-shape.

Also in this case, to prevent the sealing seat from rotating, the profile bars can expediently abut against the first abutment regions also transversally by means of a peripheral edge of the first flange.

Expediently, the first abutment regions can be defined by at least a pair of cutaway portions formed locally, in diametrically opposite positions, on an outer lateral surface of the sealing seat. First abutment regions of this type can be easily and accurately created, for example by means of milling, during manufacture of the sealing seat or also subsequently.

Preferably, each of the cutaway portions defines on the outer lateral surface of the sealing seat a flat abutment surface perpendicular to a longitudinal axis of the sealing seat and/or a flat abutment surface parallel to a longitudinal axis of the sealing seat, respectively designed to provide an axial abutment and a transverse abutment for the fastening means.

As an alternative to the formation of the above-mentioned cutaway portions, or in the case they define only abutment surfaces parallel to the longitudinal axis of the sealing seat, corresponding abutment surfaces perpendicular to said longitudinal axis can be expediently defined directly at a front face of the sealing seat.

The sealing seat and the respective receiving seat in the valve body are in any case preferably without threaded portions.

Preferably, the valve body is made in a single piece.

The shoulders for the fastening means in the valve body are preferably formed from solid in inner walls of the valve body, on transversally opposite sides relative to the receiving seat for the sealing seat.

According to a preferred embodiment, the fixed seat shut-off valve is a ball valve.

Preferably, the ball valve is provided with a C-shaped closure member (C-ball valve). This type of ball valve is particularly suitable for cryogenic applications, since the open shape of the closure member avoids problems of trapping of fluid and associated overpressure, particularly dangerous in cryogenic processes, which occur in traditional ball valves with O-shaped closure member.

Preferably, the ball valve has a double eccentric configuration. This configuration, in addition to guaranteeing an effective seal relative to the fixed sealing seat, advantageously allows wear on the sealing seat to be minimized, therefore resulting in a longer working life of the valve, since rotation of the closure member from the valve open position to the valve closed position and vice versa takes place without contact with the sealing seat, apart from in the last 3-6 degrees of rotation in closing and, correspondingly, in the first 3-6 degrees of rotation in opening of the closure member.

Expediently, for operation at high pressures and/or in the case of large diameters, the ball valve can be provided with a closure member with support pin (trunnion).

According to a possible embodiment of the sealing seat, the sealing region is provided with a sealing ring. As an alternative, the sealing region of the sealing seat is configured so as to contact the surface of the closure member so as to perform a direct sealing.

Preferably, the fastening means are insertable in said valve body and are removable from said valve body through said top-entry opening.

In a its second aspect, the invention concerns a process for assembling a fixed seat shut-off valve of the type described above, comprising the steps of:

provision a valve body, a closure member and at least one sealing seat for the closure member, the valve body comprising at least one valve inlet and at least one valve outlet extending along respective longitudinal axes, and a receiving seat for the at least one sealing seat formed at at least one of said at least one valve inlet and at least one valve outlet;

arranging the sealing seat in a freely movable way in the receiving seat in the valve body;

arranging the closure member in the valve body in a first position, in which the closure member does not cooperate with the sealing seat;

moving the closure member relative to the valve body from said first position to a second position, in which the closure member cooperates with the sealing seat, to bring and maintain temporarily the sealing seat in a final position in the receiving seat, and applying fastening means for stably fastening the sealing seat in the final position in the receiving seat, in which the fastening means are axially interposed between the sealing seat and shoulders formed in the valve body and abut at least axially against first abutment regions defined on the sealing seat and second abutment regions defined on said shoulders.

Said process offers advantages analogous to those illustrated above in relation to the first aspect of the invention in terms of greater facility and speed of assembly and removal of a sealing seat in/from a fixed seat shut-off valve.

Preferably, the step of application of the fastening means comprises inserting the fastening means in the valve body vertically or, in general, according to a transverse direction, through the top-entry opening of the valve body.

Preferably, the shut-off valve is a ball valve and the step of moving the closure member comprises rotating the closure member relative to the valve body from the first position to the second position.

Preferably, the first position of the closure member is a valve open position and the second position of the closure member is a valve closed position.

In a particularly advantageous embodiment, the process of the invention can be implemented on a shut-off valve installed in line.

Further characteristics and advantages of the invention will be clearer from the following detailed disclosure of preferred embodiments thereof, provided below by way of indicative non-limiting example, with reference to the attached drawings, in which:

FIG. 1*a*, 1*b* are schematic views in longitudinal section of a first preferred embodiment of a fixed seat shut-off valve according to the invention, respectively in a valve open configuration and a valve closed configuration;

FIG. 2*a*, 2*b* are perspective schematic views of the valve body, with a closure member and a relative sealing seat received inside it, of the valve of FIG. 1*a*, 1*b*, respectively in a valve open configuration and in a valve closed configuration;

FIG. 3*a*, 3*b* are schematic views from the top of the valve body of FIG. 2*a*, 2*b;*

FIG. 4*a*, 4*b* are schematic views in longitudinal section of the valve body of FIG. 2*a*, 2*b;*

FIG. 5*a*, 5*b* are perspective schematic views of the sealing seat and relative fastening means of the valve of FIG. 1*a*, 1*b*, in an exploded configuration and in an assembled configuration respectively;

Figure 1A:
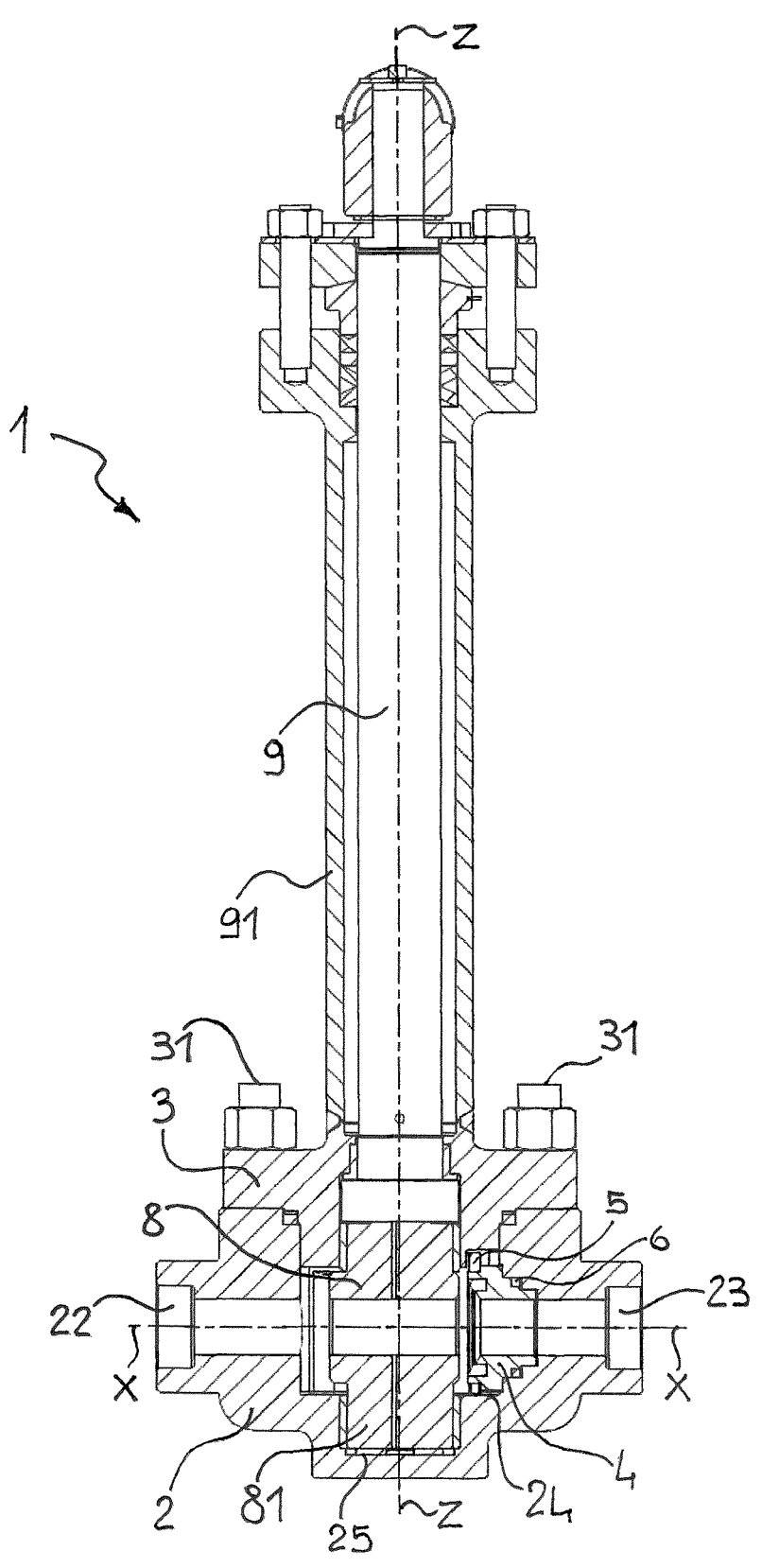
Figure 1B:
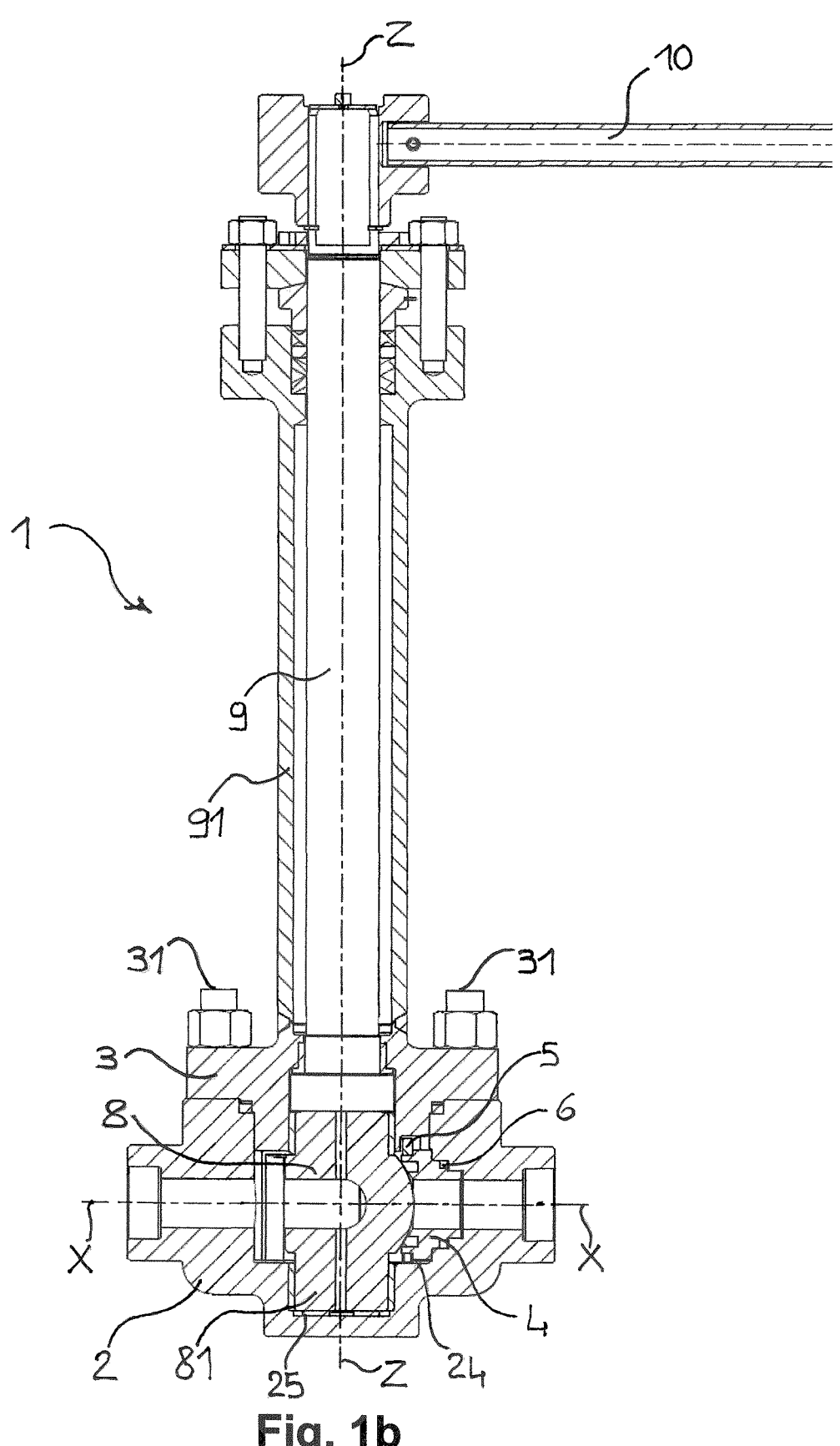
Figure 8A:
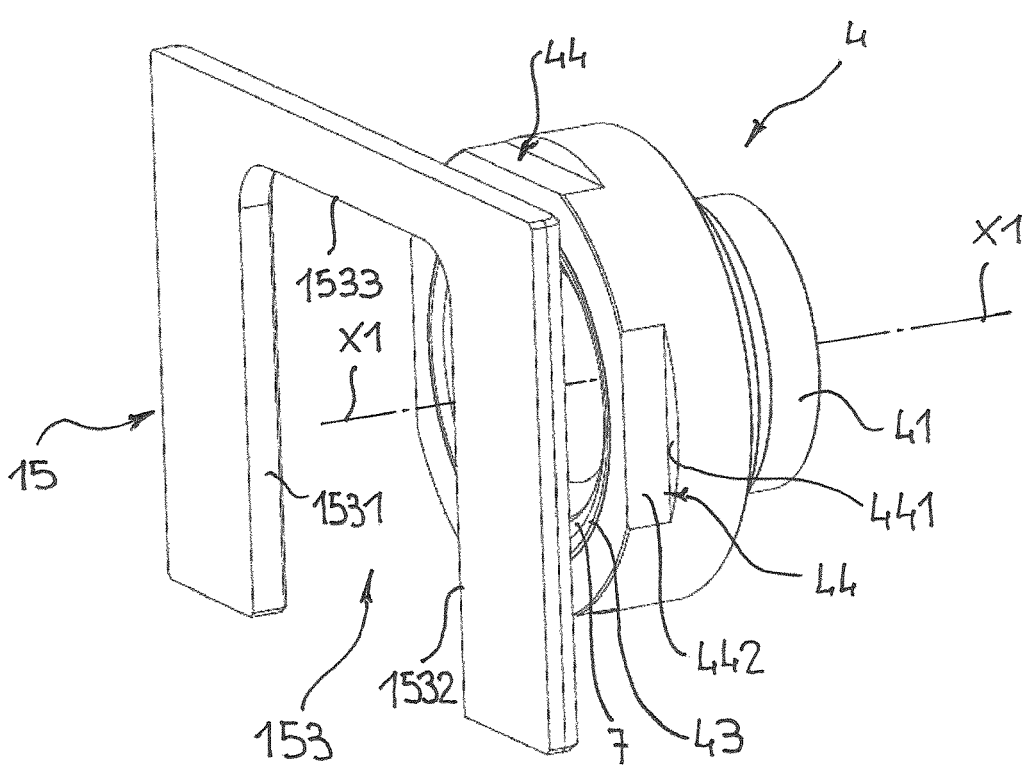
Figure 8B:
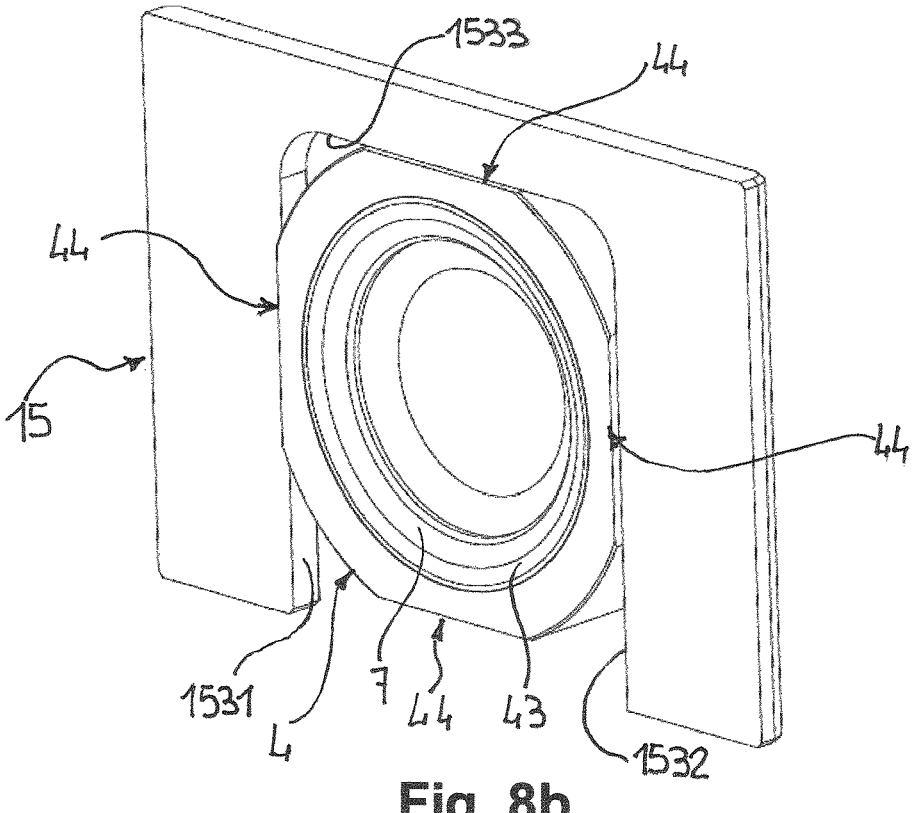
Figure 9:
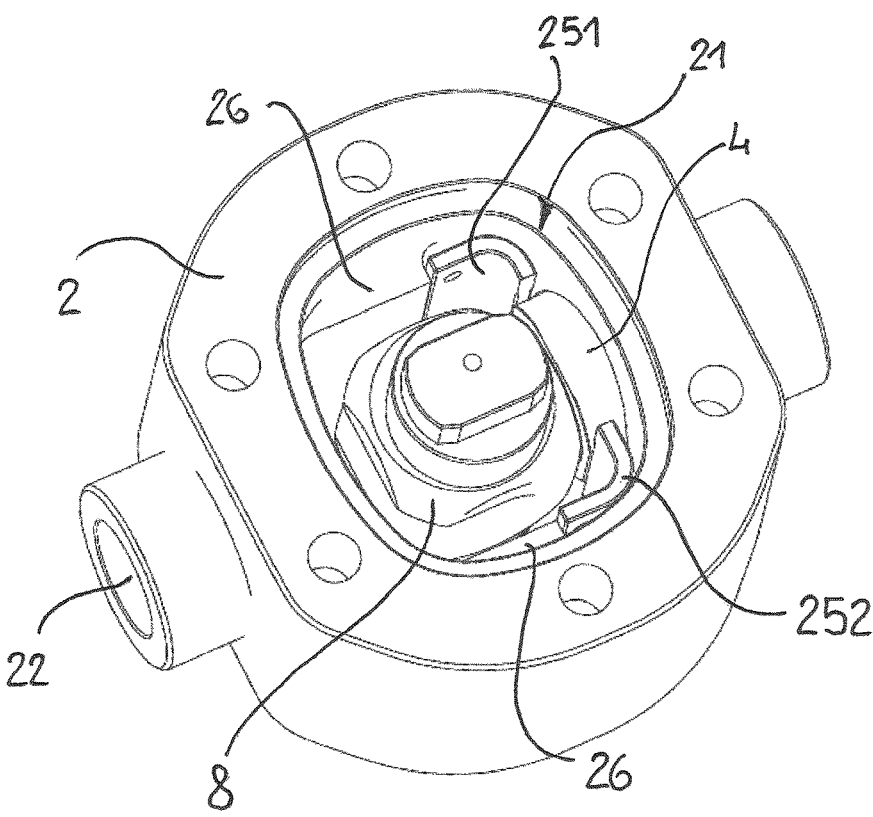
Figure 10:
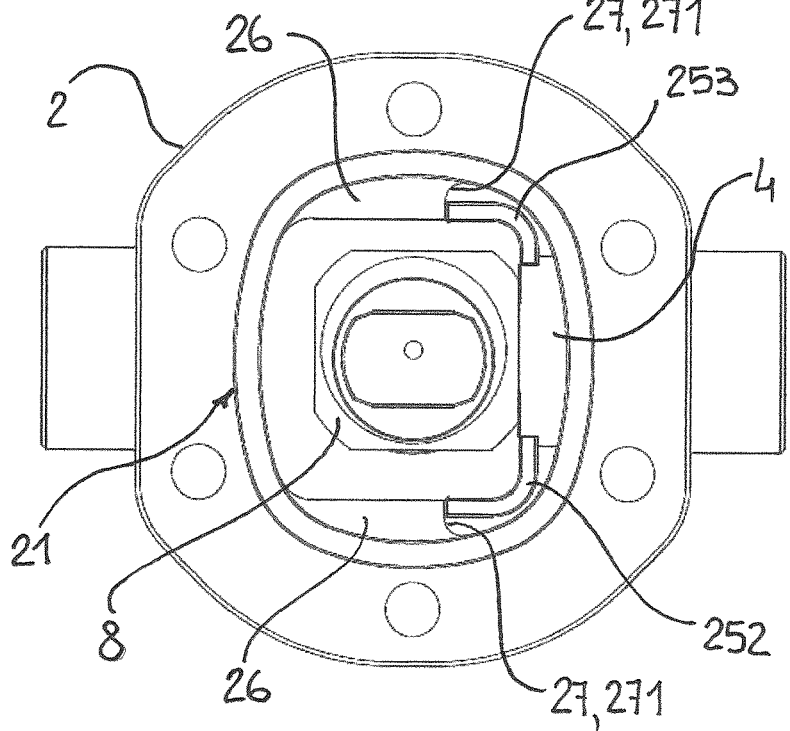
Figure 11A:
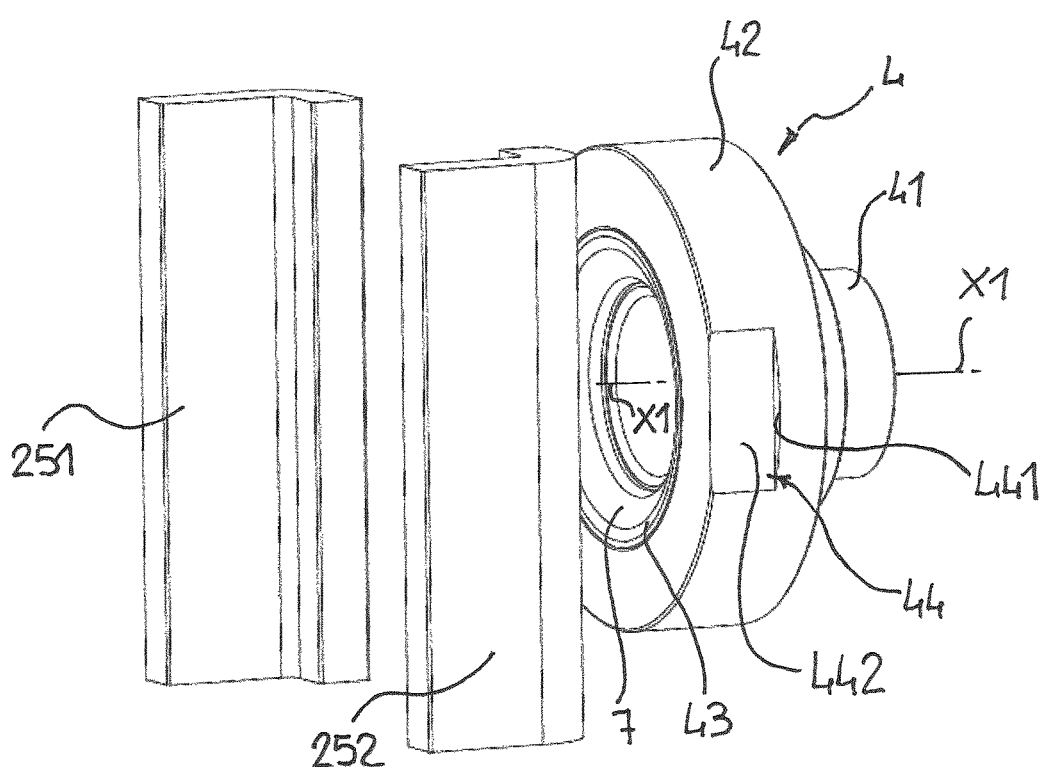
Figure 11B:
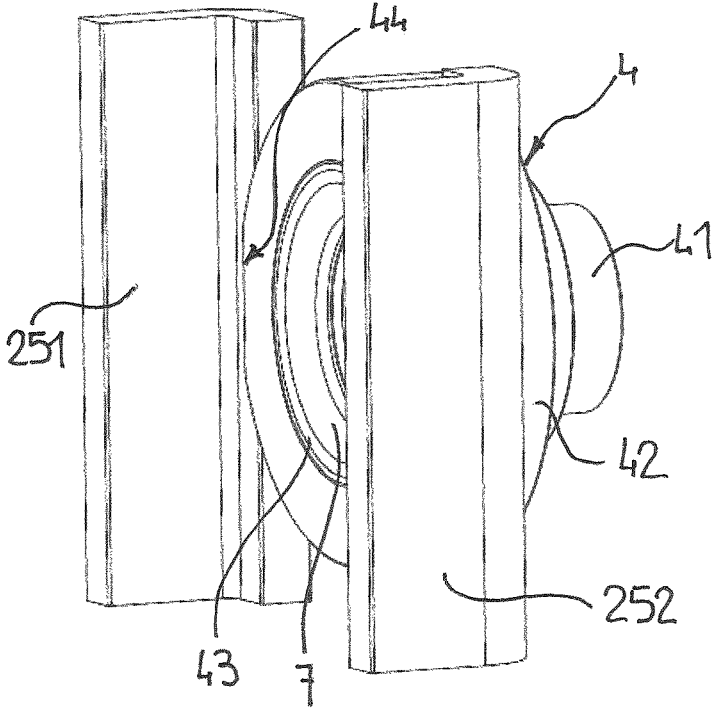
Figure 12:
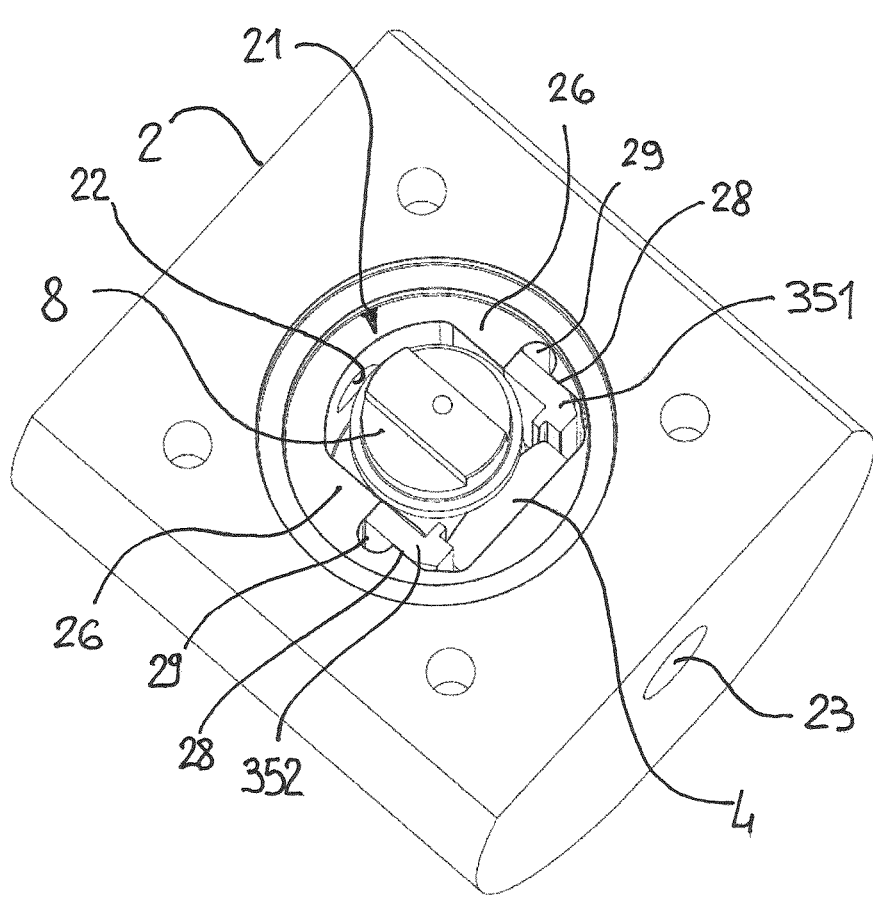
Figure 13:
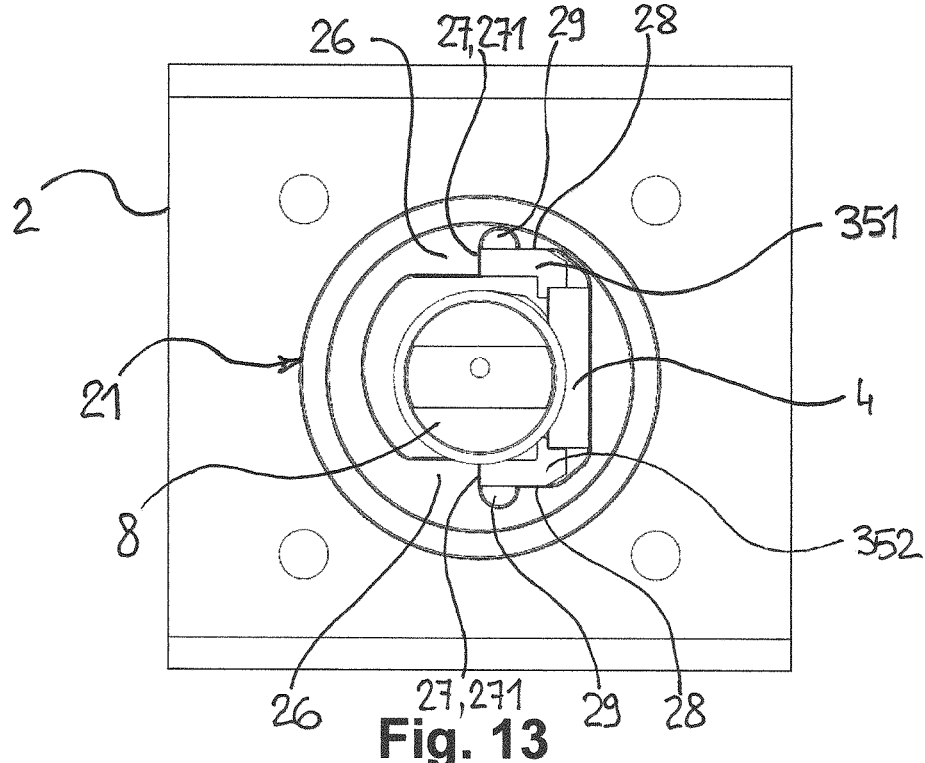
Figure 14A:
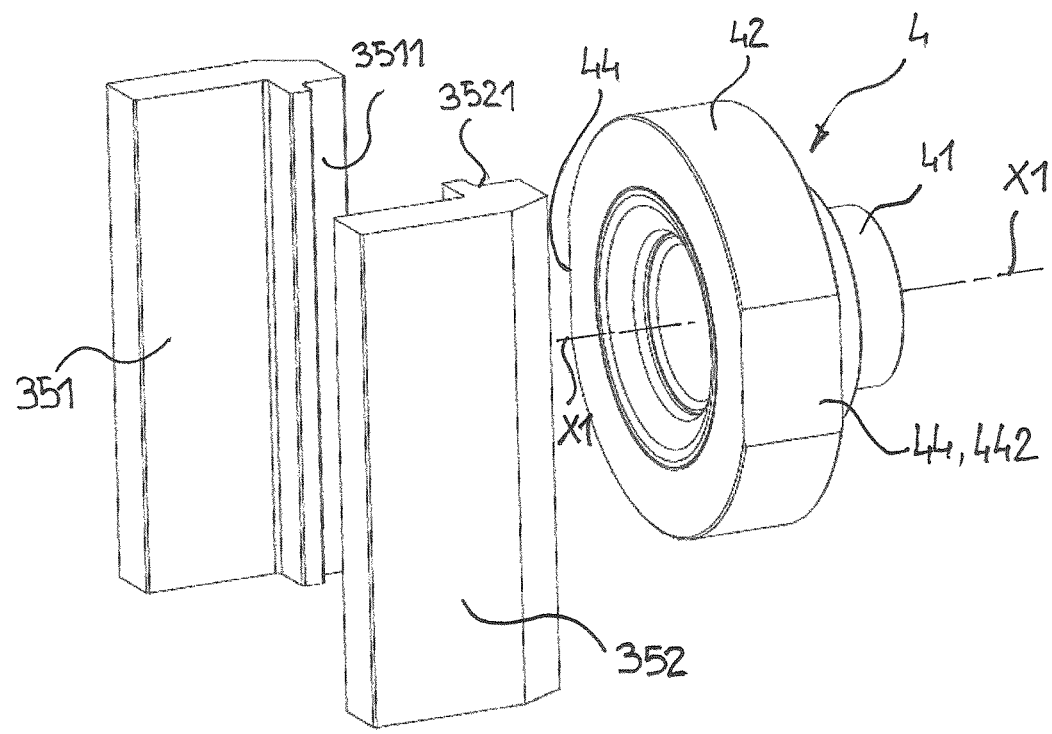
Figure 14B:
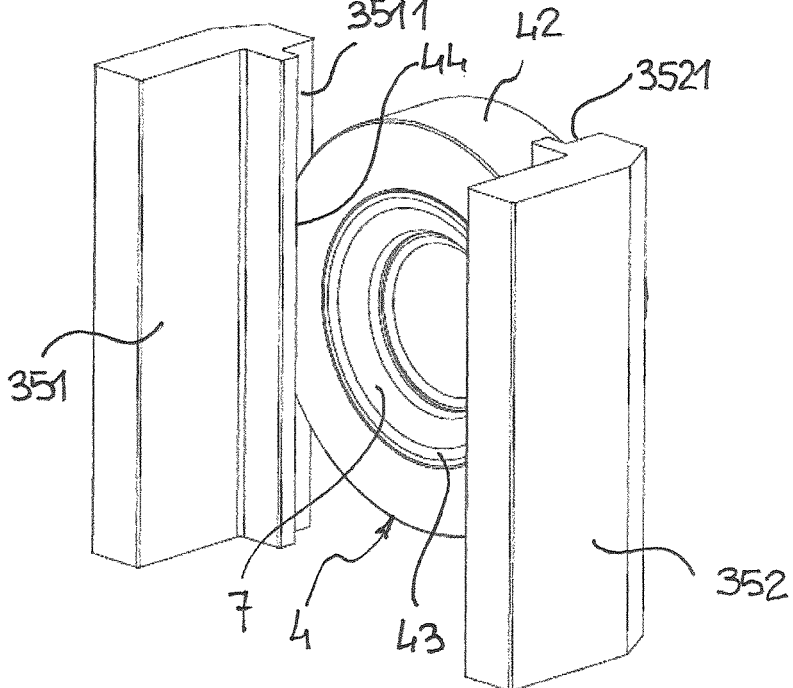

FIG. 8*a*, 8*b* are perspective schematic views of the sealing seat and relative fastening means of the second preferred embodiment of a fixed seat shut-off valve according to the invention, in an exploded configuration and in an assembled configuration respectively;

FIG. 9 is a perspective schematic view of the valve body, with a closure member and a relative sealing seat received inside it, of a third preferred embodiment of a fixed seat shut-off valve according to the invention, in a valve closed configuration;

FIG. 10 is a schematic view from the top of the valve body of FIG. 9;

FIG. 11*a*, 11*b* are perspective schematic views of the sealing seat and relative fastening means of the third preferred embodiment of a fixed seat shut-off valve according to the invention, in an exploded configuration and an assembled configuration respectively;

FIG. 12 is a perspective schematic view of the valve body, with a closure member and a relative sealing seat received inside it, of a fourth preferred embodiment of a fixed seat shut-off valve according to the invention, in a valve closed configuration;

FIG. 13 is a schematic view from the top of the valve body of FIG. 12;

FIG. 14*a*, 14*b* are perspective schematic views of the sealing seat and relative fastening means of the fourth preferred embodiment of a fixed seat shut-off valve according to the invention, in an exploded configuration and in an assembled configuration respectively;

FIG. 15*a-e* are perspective schematic views of the valve body of the shut-off valve of FIG. 1*a*, 1*b* that illustrate assembly steps thereof.

FIG. 1*a*, 1*b* show a first preferred embodiment of a fixed seat shut-off valve according to the invention, indicated overall by the reference number 1.

The valve 1 shown in said figures and described in detail below is, by way of example, a ball valve and has structural and functional characteristics that make it particularly, although not exclusively, suitable for use at cryogenic temperatures, or for applications in the petrochemical sector or in the presence of solid particles (dirty service).

The valve 1 comprises a valve body 2, which can also be seen separately in FIG. 15*a*. The valve body 2 is made in a single piece, preferably metal or metal alloy, selected according to the conditions of use established for the valve 1. For cryogenic applications, for example, stainless steel or suitable nickel-based alloys can be expediently used. The valve body 2 can be manufactured by subtractive or additive machining, or by casting.

The valve body 2 has a top-entry opening 21. The opening 21 is closed by a cover 3, removedly fixed to the valve body 2 by means of threaded fastening elements 31.

The valve body 2 further comprises a valve inlet 22 and a valve outlet 23, via which the fluid flows through the valve 1. In the embodiment shown in the figures, the valve inlet 22 and the valve outlet 23 are arranged in the valve body 2 aligned along the same longitudinal axis X-X, but they could also have distinct and intersecting longitudinal axes (angled valve). Outer end portions of the valve inlet 22 and the valve outlet 23 are configured for assembly of the valve 1 in a line. In the embodiment shown in the figures, said outer end portions are for example configured for assembly by means of weld joint, but they could be configured for any other type of assembly known to persons skilled in the art, in particular also of removable type such as, for example, an assembly by means of lug joint, wafer assembly or assembly by means of RF (Raised Face)/RTJ (Ring Type Joint) flanges.

Inside the valve body 2, at the valve outlet 23 and concentrically to it, a receiving seat 24 (which can be seen more clearly in FIG. 15*a*) is formed for a removable sealing seat 4 of the valve 1. The sealing seat 4 is fixedly received in the receiving seat 24, namely, once positioned in the receiving seat 24 and fastened by means of appropriate removable fastening means, described in further detail below with reference FIG. 2-5, it is stationary with respect to the valve body 2.

Between the sealing seat 4 and the receiving seat 24, at least one sealing element, for example a sealing ring 6, is interposed in a known way. According to its characteristics, and in particular the fact that it requires activation by compression, as in the case, for example, of graphite sealing rings, or is of the self-activating type as in the case, for example, of O-rings made of elastomeric material, the sealing ring 6 can be arranged between the receiving seat 24 and the sealing seat 4 with a certain degree of compression, or without compression.

The sealing seat 4 is preferably made in a single piece, preferably metal or metal alloy, the same as or different from that of the valve body 2, selected according to the conditions of use established for the valve 1. In particular, as can be seen also in FIG. 5*a*, 5*b*, the sealing seat 4 consists of an annular body preferably comprising at least a first axial portion 41 having smaller outer diameter, designed to be completely received in the receiving seat 24, and a second axial portion 42 having larger outer diameter, designed at least partially to axially protrude from the receiving seat 24.

At a front face, facing the inside of the valve body 2, of the sealing seat 4 an annular sealing region 43 is defined, configured to sealingly cooperate with a closure member 8 of the valve 1. According to a possible embodiment shown in the figures, the sealing region 43 is provided with at least one sealing ring 7, typically made of plastic material, for example elastomeric material. More precisely, the sealing region 43 defines a seat in which the sealing ring is arranged.

According to an alternative embodiment, a direct sealing on the surface of the sealing region 43 is provided. In other words, the sealing region 43 acts directly on the surface of the closure member 8 so as to perform a direct sealing. In this case, the sealing region 43 is preferably provided with a superficial coating in a proper material having great hardness.

As above indicated, a sealing element 6 interposed between the sealing seat 4 and the receiving seat 24 formed in the valve body 2 is provided. Therefore, the sealing element 6 contacts the sealing seat 4 in a further region opposite to the sealing region 43, i.e., a further region not facing the closure member 8.

Inside the valve body 2 a closure member 8 is received, movable relative to the valve body 2 between a valve closed position, in which it prevents a fluid flow between the valve inlet 22 and the valve outlet 23 and sealingly cooperates with the sealing region 43 of the sealing seat 4, and a valve open position, in which it allows a fluid flow between the valve inlet 22 and the valve outlet 23.

As above indicated, the opening 21 of the valve body 2 allow a top-entry in the valve body 2. In particular, through the opening 21 it is possible to insert the sealing ring 6 (meant to be inserted between the sealing seat 4 and the valve body 2), the sealing seat 4 and the closure member 8. As below better explained, the opening 21 also allows the insertion (subsequent to the insertion of the closure member and of the sealing seat) in the valve body 2 of removable fastening means suitable to fasten the sealing seat 4 in the receiving seat 24 formed in the valve body 2. Through the same opening 21, such a fastening means can be removed from the valve body 2.

The valve 1 preferably has a double eccentric configuration, so that the closure member 8 has a rotation axis Z-Z offset relative to the sealing seat 4 both in an axial direction, namely along the longitudinal axis X-X, and in a transverse direction, namely perpendicularly to the longitudinal axis X-X and, therefore, to the plane of the drawing of FIG. 1*a*, 1*b*. This provides, on the one side, a predefined degree of interference between closure member 8 and sealing region 43 of the sealing seat 4 when the closure member 8 is in the valve closed position, thus ensuring a safe static seal of the valve 1; on the other, it minimizes the contact between closure member 8 and sealing region 43 of the sealing seat 4 during rotation of the closure member 8 between the valve open and closed positions, therefore reducing the wear on the sealing seat 4.

Figure 4A:
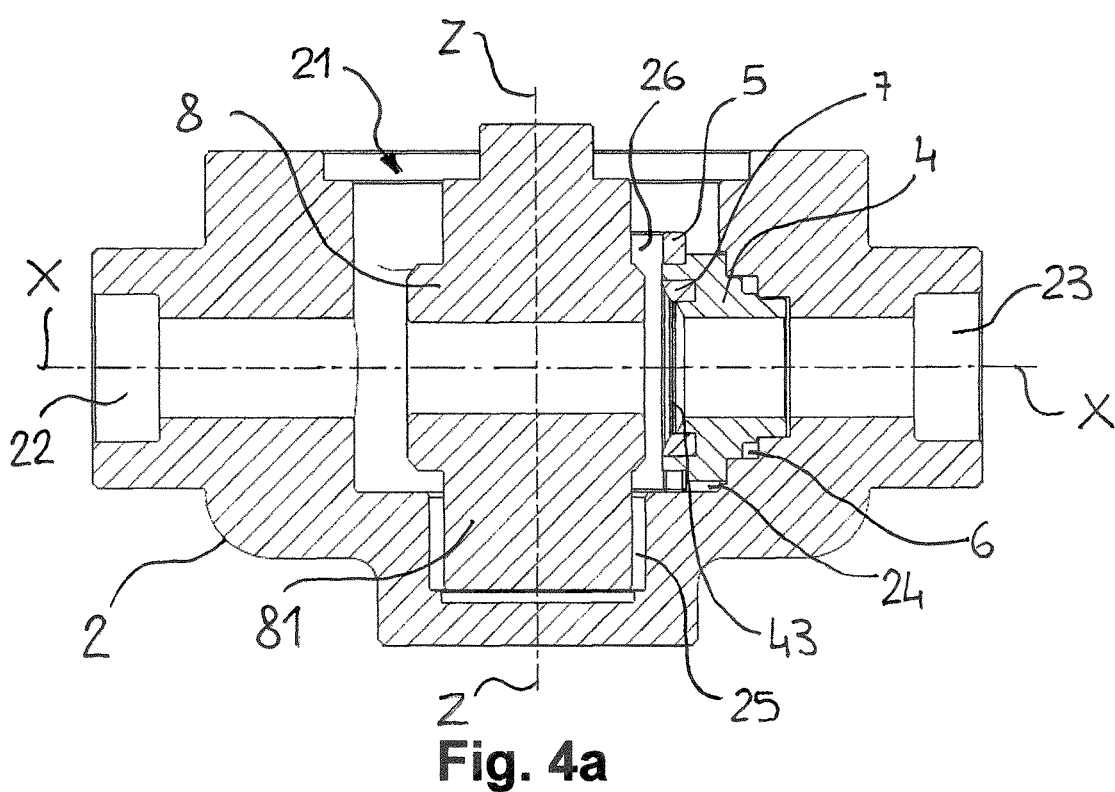
Figure 4B:
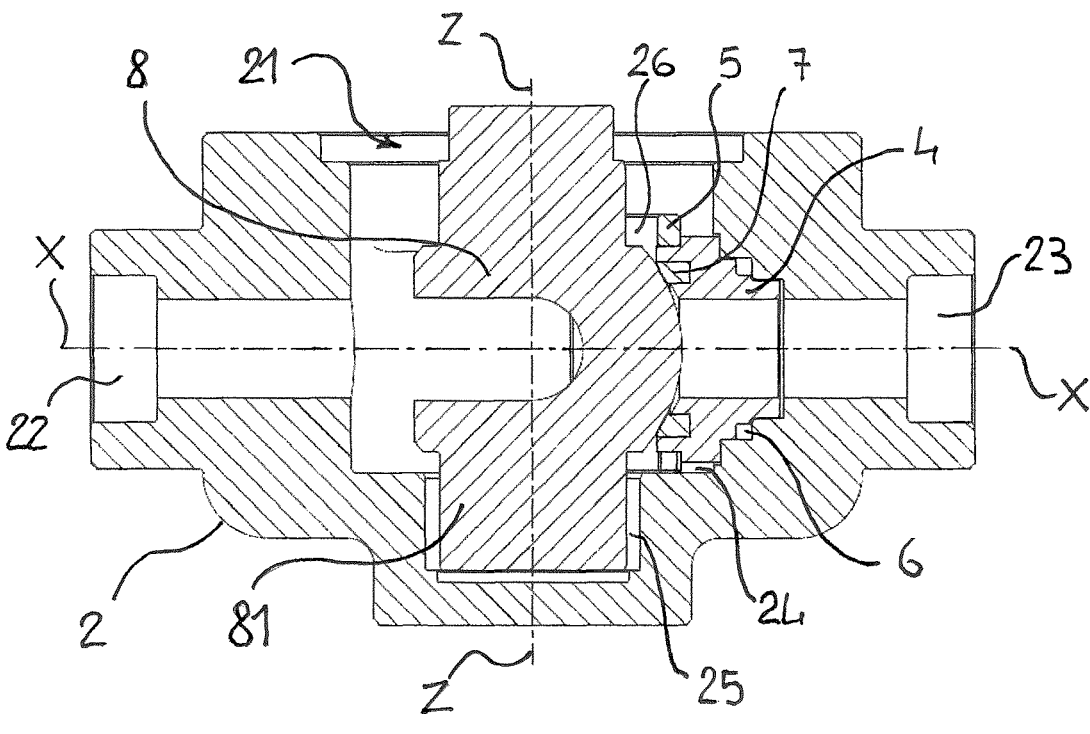

As can be seen in particular in the longitudinal section views of FIGS. 1*b* and 4*b*, which show respectively the valve 1 and the valve body 2 in closed configuration, the closure member 8 preferably has a C-shape (C-ball valve). Preferably, furthermore, the closure member 8 is provided with a support pin 81 which, in the assembled condition of the valve 1, is accommodated in a freely rotatable way in a cavity 25 formed in a base wall of the valve body 2. As already mentioned above, these characteristics of the closure member 8, among others, make the valve 1 particularly suitable for cryogenic and petrochemical applications and in the presence of solid particles. However, the invention is not tied to a specific shape of the closure member, and the closure member 8 could also have a conventional O shape and/or be without support pin (floating ball valve).

The closure member 8 is rigidly connected to a stem 9, which projects from the valve body 2 through an opening, appropriately sealed, in the cover 3, and, outside the valve body 2, is received in a relative casing 91. At one end, the stem 9 is directly connected to operating means 10 of the valve 1, for example in the form of a manual operating lever, only partially shown in FIG. 1*b*. The operating means 10 could also be of the motorised type and/or act on the stem 9 by means of the interposition of a gear drive. The operation of the valve 1 is not relevant for illustration of the invention and is in any case known to persons skilled in the art, and will therefore not be further described here.

Figure 2A:
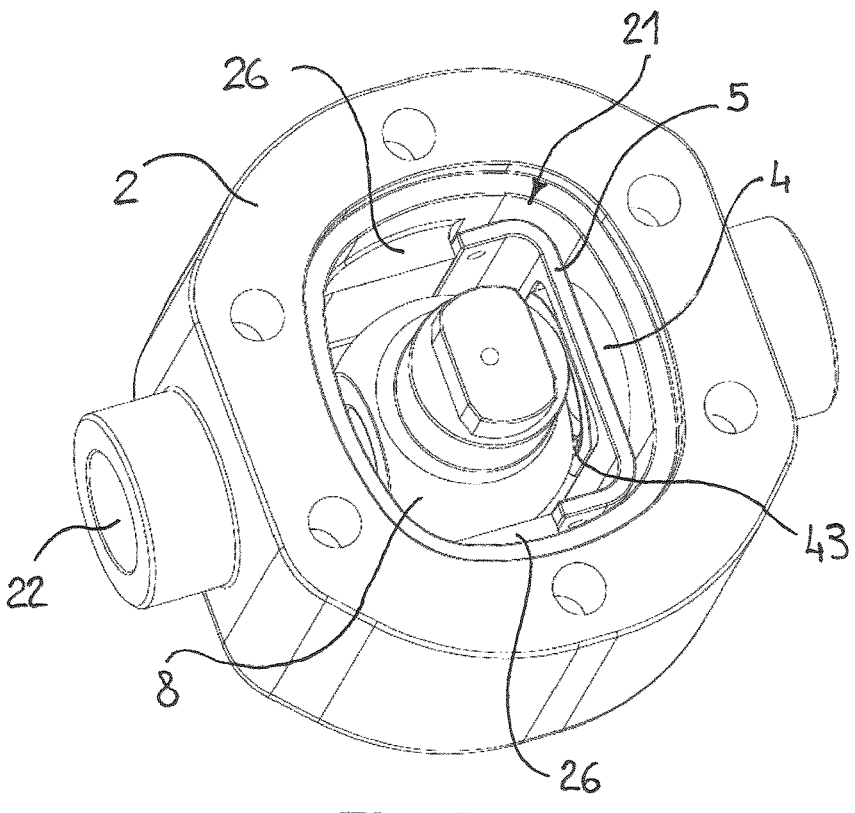
Figure 2B:
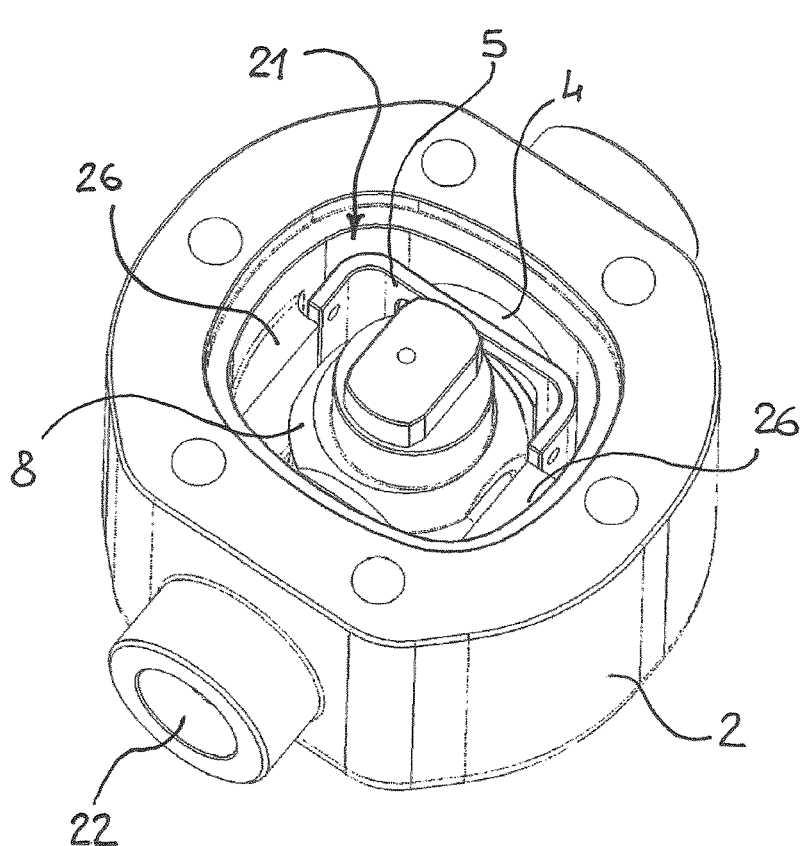
Figure 3A:
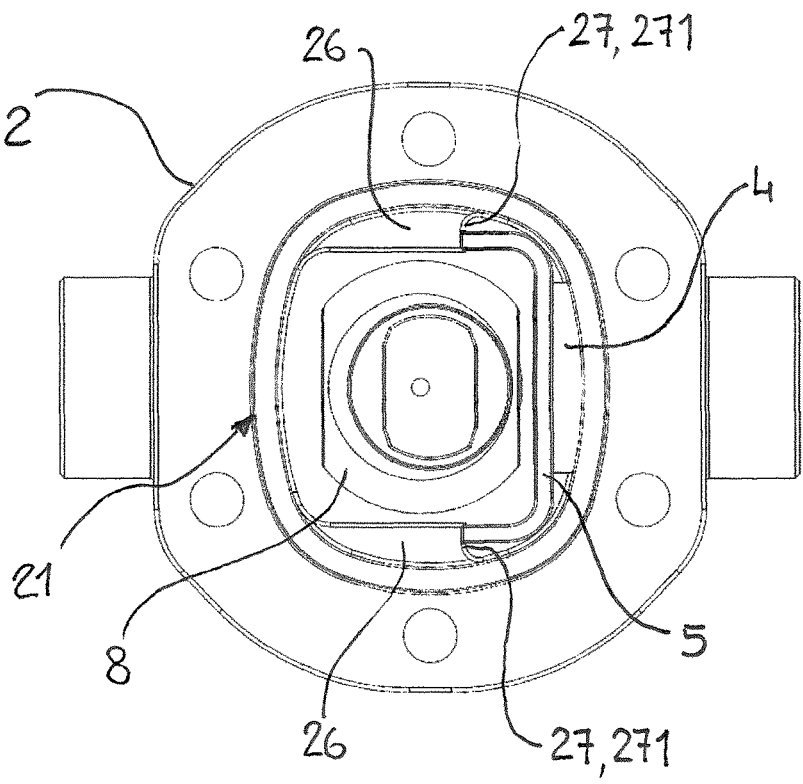
Figure 3B:
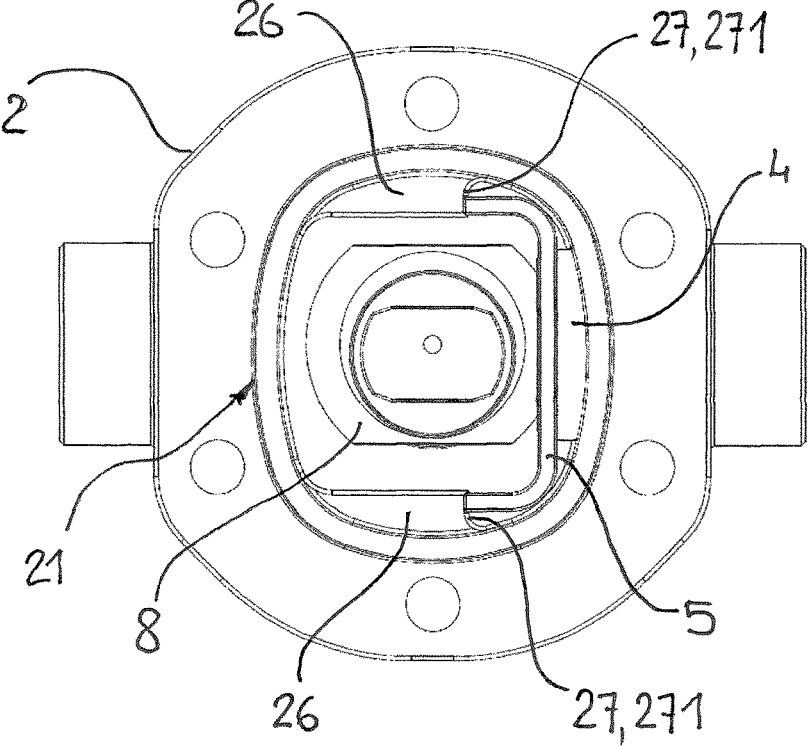

FIG. 2-4 show in further detail the valve body 2 with the sealing seat 4 and the closure member 8 assembled inside it. These figures show more clearly the removable fastening means—in this embodiment consisting of a single shaped plate-like element identified by the reference number 5—by means of which the sealing seat 4 is stably fixed in the respective receiving seat 24.

Independently of their specific form, the fastening means of the sealing seat 4 are axially interposed, namely in the direction of the longitudinal axis X-X, between the sealing seat 4 and a pair of shoulders 26 formed in the valve body 2 and abut at least axially against first abutment regions 44 defined on the sealing seat 4 and second abutment regions 27 defined on the shoulders 26. The fastening means are axially interposed between the sealing seat 4 and the shoulders 26 preferably with interference. The degree of interference should in any case always allow manual removal of the fastening means, directly or with the aid of a suitable extractor tool. In the valve 1 of the invention, fastening of the sealing seat 4 does not provide threaded connections between the sealing seat 4 and the relative receiving seat 24 and these elements are without threaded portions intended for the purpose. In other words, according to the invention the fastening means are not of the threaded type.

In all the preferred embodiments described below, the fastening means of the sealing seat 4 are preferably made of metal material, selected according to the fluid and the required operating temperatures. Alternatively, again according to the fluid and the required operating temperatures, the fastening means could be made of plastic material, for example PCTFE or PEEK, particularly suitable for cryogenic applications, nylon or polyimide.

Figure 5A:
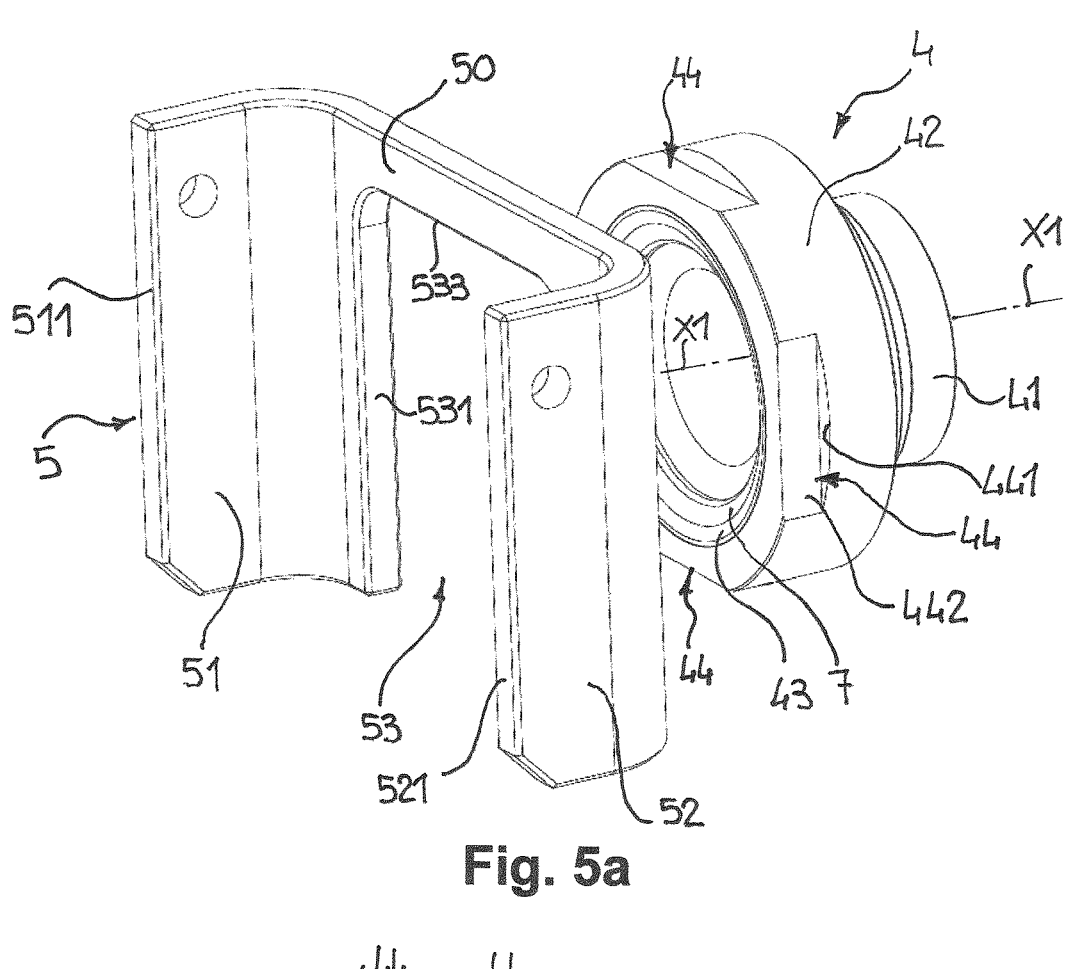
Figure 5B:
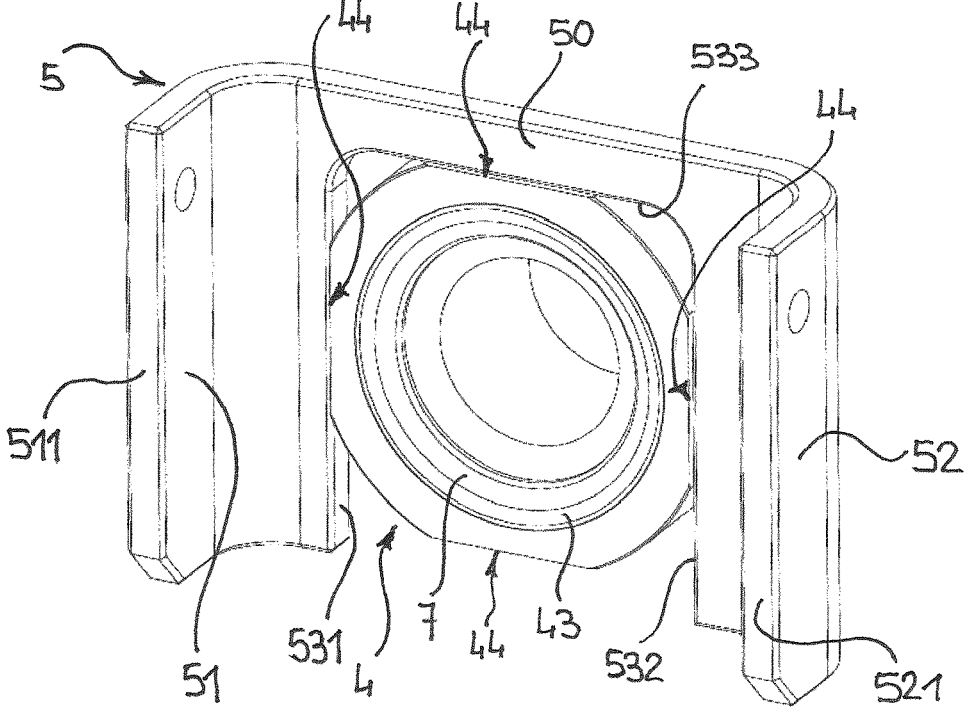

As can be seen more clearly in FIG. 5a, 5b, the first abutment regions 44 for the fastening means, formed on the sealing seat 4, consist of four cutaway portions formed locally, for example by milling, in diametrically opposite positions in pairs and angularly equally spaced, on an outer lateral surface of the second axial portion 42 of the sealing seat 4, near the front face thereof. In alternative embodiments there may be only two diametrically opposite cutaway portions (see for example FIGS. 11 and 14). Preferably, each first abutment region, namely cutaway portion 44, defines on the sealing seat 4 a first flat abutment surface 441 which extends perpendicularly to a longitudinal axis X1-X1 of the sealing seat 4, which in the assembled condition coincides with the longitudinal axis X-X of the valve 1, and a second flat abutment surface 442 which extends parallel to the longitudinal axis X1-X1, thus forming locally on the outer surface of the sealing seat 4 a straight concave edge. The first flat abutment surfaces 441 of all the first abutment regions 44 preferably have the same axial position on the sealing seat 4, namely they define together a single abutment plane perpendicularly to the longitudinal axis X1-X1 of the sealing seat 4. For clarity, the abutment surfaces 441, 442 are identified by the respective reference numbers only for one of the abutment regions 44 in FIG. 8a.

The shoulders 26 in the valve body 2 are preferably formed from solid at the inner lateral walls thereof, reciprocally opposite relative to the longitudinal axis X-X, and protrude transversally towards the inside of the valve body 2. Each shoulder 26 forms a respective second abutment region 27 for the fastening means of the sealing seat 4. Each second abutment region 27 preferably comprises a respective flat abutment surface 271, which extends perpendicularly to the longitudinal axis X-X of the valve body 2. The abutment surfaces 271 of the two shoulders 26 are preferably aligned with each other in the transverse direction, namely they define together a single abutment plane perpendicularly to the longitudinal axis X-X of the valve body 2.

As can be seen more clearly also in FIG. 5a, 5b, the shaped plate-like element 5, which here forms the fastening means of the sealing seat 4, comprises a flat central portion 50 and two lateral flanges 51, 52, also flat, which extend orthogonally and parallel to each other from the same face of the central portion 50, at two opposite sides thereof. Each flange 51, 52 is delimited by a peripheral edge having at least one rectilinear segment, respectively 511, 521, parallel to the faces of the central portion 50. In the central portion 50 a recess 53 is formed, which extends from a peripheral edge of a free side thereof towards an opposite free side and gives the central portion 50 a generically upturned U shape in a front view of the shaped plate-like element 5. The recess 53 is delimited by a peripheral edge preferably formed of rectilinear segments, in particular two segments 531, 532 parallel to the flanges 51, 52 and one segment 533 perpendicular to the lateral flanges 51, 52, which transversally joins the segments 531, 532 (FIG. 5a). The recess 53 is sized so that the shaped plate-like element 5 can be arranged transversally across the sealing seat 4, leaving freely exposed the sealing region 43 on the front face thereof, as can be seen in particular from FIG. 5b.

As shown more clearly in FIG. 2-4, when assembled in the valve body 2, the shaped plate-like element 5 described above axially abuts on one side against the abutment surfaces 441, perpendicular to the longitudinal axis X-X, of three of the four cutaway portions 44 formed on the sealing seat 4 by means of the face of the central portion thereof 50 which is opposite to the face from which the flanges 51, 52 extend; on the other, it abuts against the abutment surfaces 271 defined on the shoulders 26 of the valve body 2 by means of the rectilinear segments 511, 521 of the peripheral edge of the flanges 51, 52. In this way, the shaped plate-like element 5 axially blocks the sealing seat 4 with respect to the valve body 2. Furthermore, the shaped plate-like element 5 abuts transversally against the abutment surfaces 442, parallel to the longitudinal axis X-X, of the above-mentioned three of the four cutaway portions 44 formed on the sealing seat 4 by means of the rectilinear segments 531, 532, 533 of the peripheral edge of the recess 53. In this way, the shaped plate-like element 5 also prevents rotations of the sealing seat 4 relative to the valve body 2.

Figure 6:
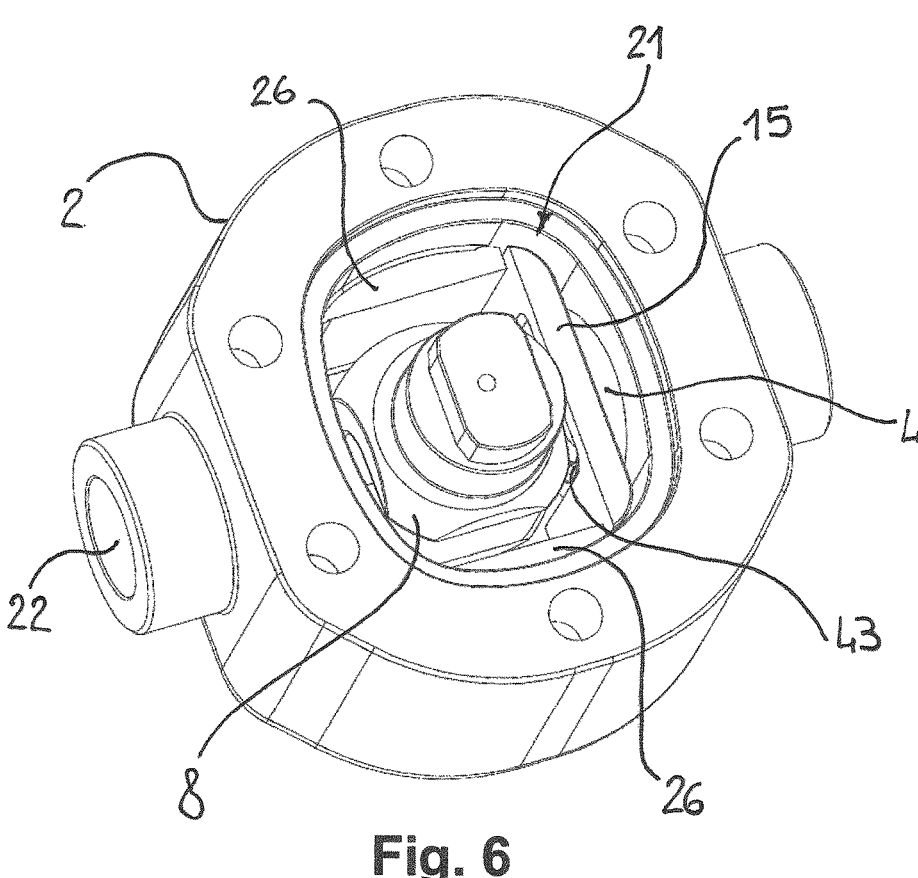
FIG. 6 is a perspective schematic view of the valve body, with a closure member and a relative sealing seat received inside it, of a second preferred embodiment of a fixed seat shut-off valve according to the invention, in a valve open configuration.
Figure 7:
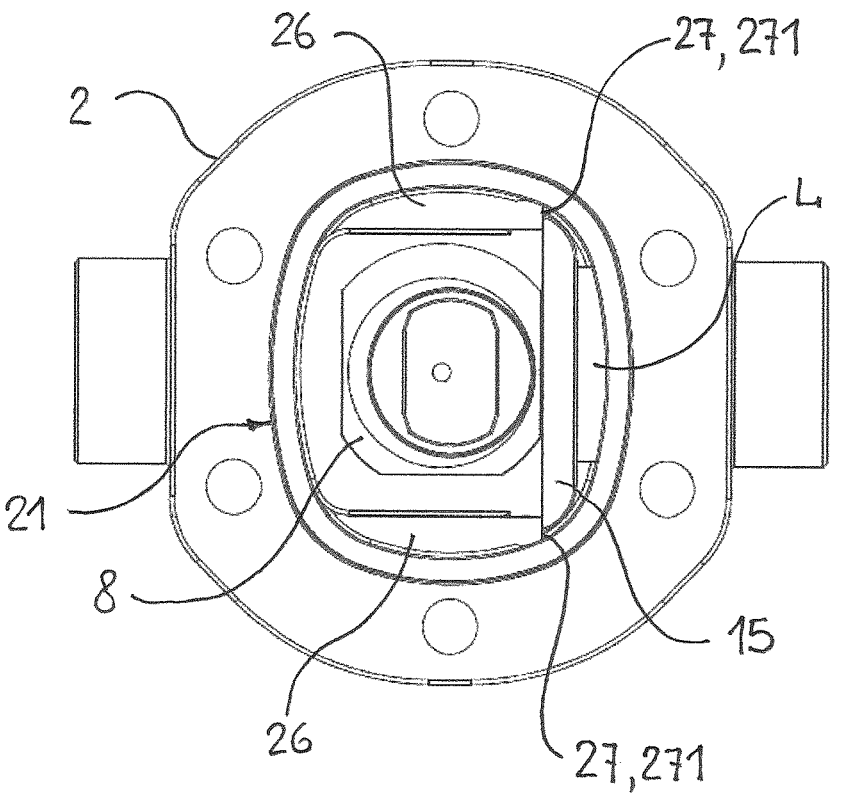
FIG. 7 is a schematic view from the top of the valve body of FIG. 6.

FIG. 6-8 show a second preferred embodiment of the valve 1, which differs from the embodiment of FIG. 1-5 due to the shape of the fastening means of the sealing seat 4. Elements in common with the preceding embodiment are indicated by the same reference numbers and are not described again here.

The fastening means of the sealing seat 4 are in this case again made in a single piece, but consist of a flat plate-like element 15, having a configuration analogous to that of the central portion 50 of the shaped plate-like element 5 previously described. In particular, the flat plate-like element 15 has a preferably quadrilateral base configuration, with a recess 153 which extends from one side of its peripheral edge towards an opposite side, thus giving the flat plate-like element 15 a generically upturned U shape in a front view. The recess 153 is delimited by a peripheral edge preferably formed of rectilinear segments, in particular two segments 1531, 1532 mutually parallel and a segment 1533 perpendicular to the segments 1531, 1532, which joins them transversally (FIG. 8a). The recess 153 is sized so that the flat plate-like element 15 can be arranged transversally across the sealing seat 4, leaving freely exposed the sealing region 43 on the front face thereof, as can be seen in particular from FIG. 8b.

In this case, when assembled in the valve body 2 (FIGS. 6 and 7), the flat plate-like element 15 axially abuts against the abutment surfaces 441 of three of the four cutaway portions 44 formed on the sealing seat 4 and against the abutment surfaces 271 defined on the shoulders 26 of the valve body 2 respectively by means of one of its two opposite faces, thus blocking the sealing seat 4 with respect to the valve body 2 in an axial direction. Furthermore, the flat plate-like element 15 abuts transversally against the abutment surfaces 442 of the above-mentioned three of the four cutaway portions 44 formed on the sealing seat 4 by means of the rectilinear segments 1531, 1532, 1533 of the peripheral edge of the recess 153, thus also preventing rotations of the sealing seat 4 with respect to the valve body 2.

FIG. 9-11 show a third preferred embodiment of the valve 1, which differs from the embodiments previously described due to the form of the fastening means of the sealing seat 4. Elements in common with the preceding embodiments are indicated by the same reference numbers and are not described again here.

In this embodiment the fastening means of the sealing seat 4 consist of a pair of rectilinear profile bars 251, 252, axially interposed between the sealing seat 4 and the shoulders 26 of the valve body 2 on transversally opposite sides with respect to the sealing seat 4. The profile bars 251, 252 are preferably identical to each other and preferably have a generically L-shaped profile.

When assembled in the valve body 2 each of the profile bars 251, 252 axially abuts against the abutment surface 441 of one of the cutaway portions 44 formed on the sealing seat 4 and against the abutment surface 271 of one of the shoulders 26 of the valve body 2 respectively by means of a face of a first flange of the L shape and by means of a rectilinear longitudinal peripheral edge of a second flange of the L shape, thus blocking the sealing seat 4 with respect to the valve body 2 in an axial direction. Furthermore, each of the profile bars 251, 252 abuts also transversally against the abutment surface 442 of the corresponding cutaway portion 44 on the sealing seat 4 by means of a rectilinear longitudinal peripheral edge of the first flange, thus also preventing rotations of the sealing seat 4 with respect to the valve body 2.

In this embodiment only two first abutment regions are necessary on the sealing seat 4, one for each profile bar 251, 252, hence only one pair of diametrically opposite cutaway portions 44 can be formed on the sealing seat 4.

FIG. 12-14 show a fourth preferred embodiment of the valve 1, which differs from the embodiments previously described due to the form of the fastening means of the sealing seat 4 and the form of the first abutment regions on the sealing seat 4. Elements in common with the preceding embodiments are indicated by the same reference numbers and are not described again here.

Analogously to the embodiment of FIG. 9-11, the fastening means of the sealing seat 4 also in this case consist of a pair of rectilinear profile bars 351, 352, axially interposed between the sealing seat 4 and the shoulders 26 of the valve body 2 on transversally opposite sides with respect to the sealing seat 4. The profile bars 351, 352 are preferably identical to each other and again preferably have a generically L-shaped profile. In this case, however, in each of the profile bars 351, 352 one of the two flanges of the L shape, which is designed to abut against the sealing seat 4, has at its own rectilinear longitudinal peripheral edge a straight concave edge, respectively 3511, 3521, by means of which said peripheral edge can abut against a respective first abutment region 44 on the sealing seat 4 not only transversally, as in the embodiment of FIG. 9-11, but also axially.

Consequently, in this embodiment, the cutaway portions 44 on the outer surface of the sealing seat 4, defining the first abutment regions for the fastening means, can be configured as simple flattenings of the outer surface of the second axial portion 42 of the sealing seat 4, each of which defines only one abutment surface 442 parallel to the longitudinal axis X1-X1 of the sealing seat 4 (FIG. 14a). The abutment surfaces perpendicular to the longitudinal axis X1-X1 are in this case defined directly on the front face of the sealing seat 4.

Also in this embodiment only two first abutment regions are necessary on the sealing seat 4, one for each profile bar 351, 352, so that only one pair of diametrically opposite cutaway portions (flattenings) 44 can be formed on the sealing seat 4.

When assembled in the valve body 2, each of the profile bars 351, 352 axially abuts against the front face of the sealing seat 4 by means of a first flat surface of the respective edge 3511, 3521 formed at the peripheral edge of a first flange thereof, and against the abutment surface 271 of one of the shoulders 26 of the valve body 2 by means of a rectilinear longitudinal peripheral edge of a second flange thereof, thus blocking the sealing seat 4 with respect to the valve body 2 in an axial direction. Furthermore, each of the profile bars 351, 352 abuts also transversally against the abutment surface 442 of a corresponding cutaway portion (flattening) 44 on the sealing seat 4 by means of a second flat surface of said respective edge 3511, 3521, thus also preventing rotations of the sealing seat 4 with respect to the valve body 2.

In addition, in this embodiment each of the profile bars 351, 352 transversally abuts also against the valve body 2. In further detail, as can be seen from FIG. 12, 13, in the lateral walls of the valve body 2 from which the shoulders 26 protrude, downstream of the latter, a flat surface 28 is formed that extends parallel to the longitudinal axis X-X and, therefore, perpendicular to the abutment surfaces 271 on the axially adjacent shoulder 26. Each of the profile bars 351, 352 abuts against the respective flat surface 28 by means of a face of the second flange thereof. In this case, to facilitate extraction of the profile bars 351, 352 from the valve body 2, each flat surface 28 can be provided with a vertical recess 29, in which a suitable extractor tool, for example, can be inserted. The configuration described can be expedient, where necessary, to make the arrangement of the profile bars 351, 352 in the valve body 2 more stable and could also be used for the profile bars 251, 252 in the embodiment of FIG. 9-11.

With reference to FIG. 15a-e and again to FIG. 2b, a preferred embodiment of a process according to the invention for assembling the valve 1 will now be described. By way of example, reference will be made here to the embodiment of the valve 1 shown in FIG. 1-5, but the following applies also to the other embodiments of the valve 1 previously described.

In a first step of the process, a valve body 2 (FIG. 15a), a sealing seat 4 and a closure member 8 are provided having the characteristics described above.

In a subsequent step (FIG. 5b), through the top-entry opening 21 of the valve body 2 the sealing seat 4 is positioned in a freely movable way in the respective receiving seat 24 in the valve body 2, at least one sealing ring 6 having been previously arranged in the receiving seat 24 or on the sealing seat 4 to ensure the seal between the sealing seat 4 and the receiving seat 24.

In a subsequent step (FIG. 15c), again through the top-entry opening 21, the closure member 8 is arranged in the valve body 2 in a first position, in particular here the valve open position, in which it does not cooperate with the sealing seat 4.

In a subsequent step (FIG. 15d), the closure member 8 is moved, in particular here rotated, inside the valve body 2 from the first position to a second position, in particular here the valve closed position, in which it cooperates with the sealing seat 4. In this way, the sealing seat 4 is brought to, in particular pressed, and temporarily maintained in its final axial position in the receiving seat 24. In this step, thanks to the axial pressure exerted by the closure member 8 on the sealing seat 4, it is also possible, if necessary, to activate the sealing ring 6, subjecting it to a predetermined compression at least axially between the sealing seat 4 and the receiving seat 24.

In a subsequent step, (FIG. 2*b*), the fastening means are applied, here the shaped plate-like element 5, to stably fasten the sealing seat 4 in its final position in the receiving seat 24. Through the top-entry opening 21, the fastening means are axially interposed between the sealing seat 4 and the shoulders 26 in the valve body 2 and in their operating position axially abut, preferably with a certain degree of interference, against the first abutment regions 44 defined on the sealing seat 4 and against the second abutment regions 27 defined on the shoulders 26, as described above. The application of the fastening means therefore consists in inserting the latter, in a substantially vertical direction, namely perpendicularly to the longitudinal axis X-X of the valve 1, between the sealing seat 4 and the shoulders 26. In particular, in this case the shaped plate-like element 5 is also arranged across the sealing seat 4, as described above, and thus secures the sealing seat 4 not only relative to axial translations, but also relative to rotations.

Figure 15E:
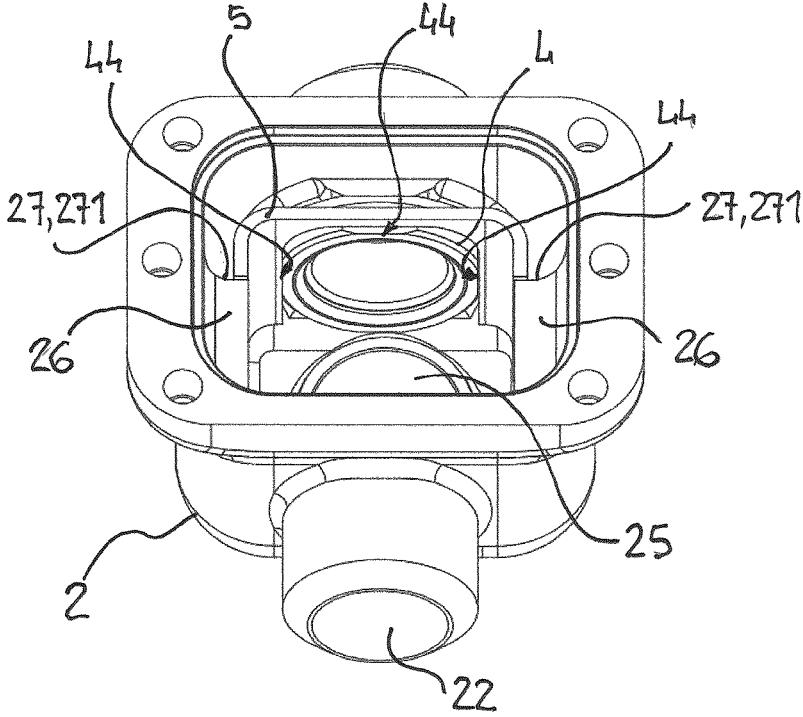

Once the fastening means have been applied, the sealing seat 4 is stably fixed to the valve body 2 and can maintain its position independently of the position and also the presence of the closure member 8 in the valve body 2 (FIG. 15*e*).

The steps described above of the assembly process of the invention can expediently be actuated in an identical manner, and just as easily, both on a valve 1 not installed and on a valve 1 installed in line.

Subsequent disassembly of the valve 1 for inspection, maintenance or replacement of components, in particular of the sealing seat 4, can be performed just as simply and rapidly by following the steps previously described in reverse order; the fastening means of the sealing seat 4 can be removed, namely extracted, independently of the presence and position of the closure member 8 in the valve body 2.

The present invention therefore provides a fixed seat shut-off valve and relative assembly process that allow operations for the removal and reassembly of a sealing seat from/in the valve body to be performed particularly simply and rapidly, guaranteeing effective maintainability of the sealing seat and the valve, both when not installed and when installed in line.

Although the preceding detailed disclosure of preferred embodiments of the invention refer to a fixed seat ball valve, the concepts underlying the present invention, as defined in the attached claims, can be applied also to other types of fixed seat shut-off valve, in particular to fixed seat gate valves.

The invention claimed is:

1. A fixed seat shut-off valve, comprising:
    a valve body configured to receive a closure member, comprising at least one valve inlet and at least one valve outlet extending along respective longitudinal axes, and a top-entry opening;
    the closure member received in the valve body and movable relative to the valve body between a valve closing position and a valve opening position;
    at least one removable sealing seat for the closure member, comprising a sealing region configured to sealingly cooperate with the closure member, the sealing region being disposed on a front face of the at least one removable sealing seat, the at least one removable sealing seat being fixedly received at least partially in a respective receiving seat formed in the valve body at at least one of the at least one valve inlet or at least one valve outlet; and
    a sealing element disposed between the at least one removable sealing seat and the respective receiving seat formed in the valve body;
    wherein the at least one removable sealing seat is fastened in the respective receiving seat via one or more fasteners which are axially interposed between the at least one removable sealing seat and shoulders formed in the valve body and abut at least axially against first abutment regions defined on the at least one removable sealing seat and against second abutment regions defined on the shoulders, wherein the shoulders formed in the valve body are defined in front of the at least one removable sealing seat on a same side as the front face of the at least one removable sealing seat.

2. The fixed seat shut-off valve of claim 1, wherein the one or more fasteners abut against the first abutments regions also transversally.

3. The fixed seat shut-off valve of claim 1, wherein the sealing region of the at least one removable sealing seat is provided with a sealing ring.

4. The fixed seat shut-off valve of claim 1, wherein the sealing region of the at least one removable sealing seat is configured so as to contact a surface of the closure member so as to perform a direct sealing.

5. The fixed seat shut-off valve of claim 1, wherein the one or more fasteners are configured to be inserted in the valve body and removed from the valve body through the top-entry opening.

6. The fixed seat shut-off valve of claim 1, wherein the first abutments regions are defined by at least one pair of cutaway portions formed at diametrically opposite positions on an outer lateral surface of the at least one removable sealing seat.

7. The fixed seat shut-off valve of claim 6, wherein each cutaway portion of the at least one pair of cutaway portions defines on the outer lateral surface of the at least one removable sealing seat a flat abutment surface perpendicular to a longitudinal axis of the at least one removable sealing seat and/or a flat abutment surface parallel to the longitudinal axis of the at least one removable sealing seat.

8. The fixed seat shut-off valve of claim 1, wherein the fixed seat shut-off valve is a ball valve.

9. The fixed seat shut-off valve of claim 8, wherein the ball valve comprises a C-shaped closure member.

10. The fixed seat shut-off valve of claim 1, wherein the one or more fasteners comprise a pair of profile bars located on transversally opposite sides of the at least one removable sealing seat.

11. The fixed seat shut-off valve of claim 10, wherein the pair of profile bars have a generally L-shaped profile and axially abut against the first abutment regions and the second abutments regions respectively via a face of a first flange of the generally L-shaped profile and via a peripheral edge of a second flange of the generally L-shaped profile.

12. The fixed seat shut-off valve of claim 11, wherein the pair of profile bars abut also transversally against the first abutment regions via a peripheral edge of the first flange.

13. The fixed seat shut-off valve of claim 1, wherein the one or more fasteners comprise a single piece.

14. The fixed seat shut-off valve of claim 13, wherein the one or more fasteners comprise a flat plate element having two opposite faces and a recess, which extends from a peripheral edge of the flat plate element and is arranged and configured so as to expose at least a sealing region of the at least one removable sealing seat when the flat plate element is axially interposed between the at least one removable sealing seat and the shoulders in the valve body, and wherein the flat plate element axially abuts against the first abutment regions and the second abutments regions respectively via one of the two opposite faces.

15. The fixed seat shut-off valve of claim 14, wherein the flat plate element is located transversally across the at least one removable sealing seat via the respective recess and abuts also transversally against the first abutment regions via peripheral edges of the recess.

16. The fixed seat shut-off valve of claim 13, wherein the one or more fasteners comprise a shaped plate element having a flat central portion provided with a recess, which extends from a peripheral edge of the flat central portion and is arranged and configured so as to expose at least a sealing region of the at least one removable sealing seat when the shaped plate element is axially interposed between the at least one removable sealing seat and the shoulders in the valve body, and two flanges extending perpendicularly from a same face of the central portion, on opposite sides of the recess, and wherein the shaped plate element axially abuts against the first abutment regions and the second abutments regions respectively via a face of the central portion which lies opposite to the face from which the two flanges extend and via peripheral edges of the two flanges.

17. The fixed seat shut-off valve of claim 16, wherein the shaped plate element is located transversally across the at least one removable sealing seat via the respective recess and abuts also transversally against the first abutment regions via peripheral edges of the recess.

18. A method for assembling a fixed seat shut-off valve comprising a valve body, a closure member, and at least one sealing seat for the closure member, wherein the valve body comprises at least one valve inlet and at least one valve outlet extending along respective longitudinal axes, and a receiving seat for the at least one sealing seat formed at at least one of the at least one valve inlet or at least one valve outlet, the method comprising:

arranging the at least one removable sealing seat into the receiving seat in the valve body in a freely movable way;

arranging the closure member into the valve body in a first position, in which the closure member does not cooperate with the at least one removable sealing seat;

moving the closure member relative to the valve body from the first position to a second position, in which the closure member cooperates with the at least one removable sealing seat, for bringing and temporarily holding the receiving seat in a final position in the receiving seat; and stably fastening the at least one removable sealing seat in the final position in the receiving seat, using one or more fasteners which are axially interposed between the at least one removable sealing seat and shoulders formed in the valve body and abut at least axially against first abutment regions defined on the at least one removable sealing seat and against second abutment regions defined on the shoulders, wherein the shoulders formed in the valve body are defined in front of the at least one sealing seat.

19. The method of claim 18, wherein the valve body has a top-entry opening and the step of stably fastening the at least one removable sealing seat comprises vertically inserting the one or more fasteners into the valve body through the top entry opening.

20. The method of claim 18, wherein the fixed-seat shut-off valve is a ball valve and the step of moving the closure member comprises rotating the closure member relative to the valve body from the first position to the second position.

* * * * *